Apr. 10, 1923.
J. J. WILSON
1,451,090
COTTON HARVESTER
Filed Apr. 2, 1920     5 sheets-sheet 5
Fig. 6.
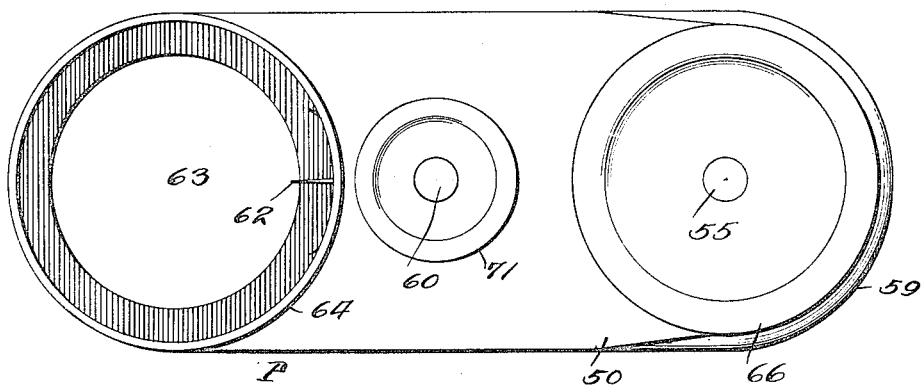
Fig. 7.
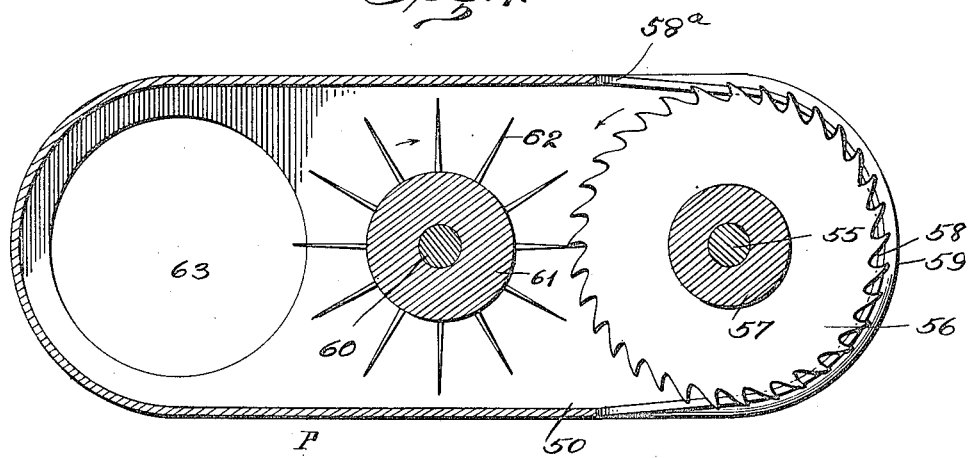
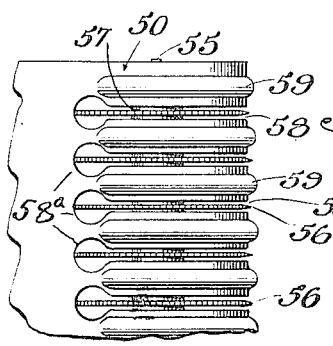
Fig. 10.
Inventor
John J. Wilson
By Mason, Fenwick & Lawrence
Attorneys Patented Apr. 10, 1923.

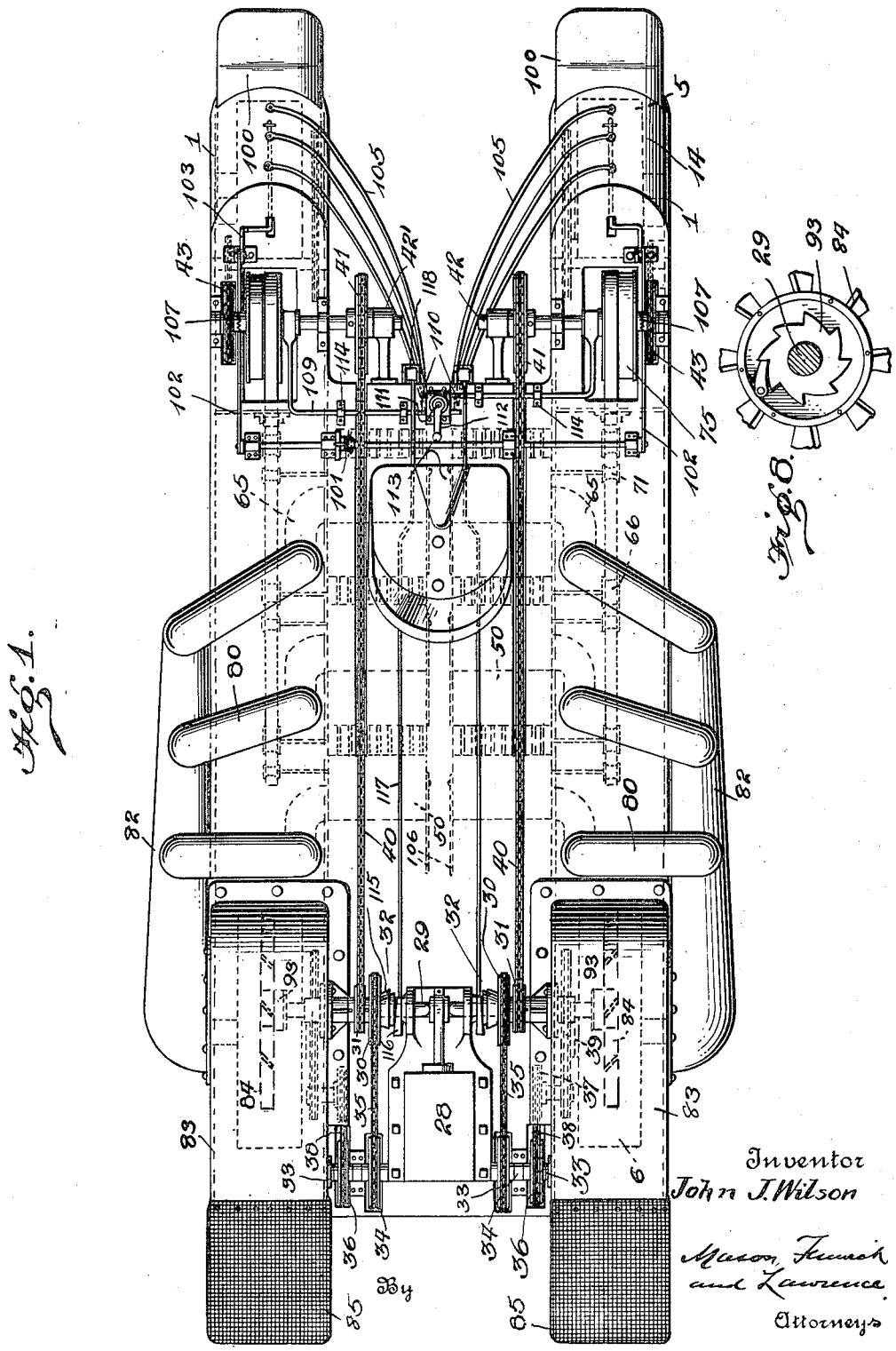

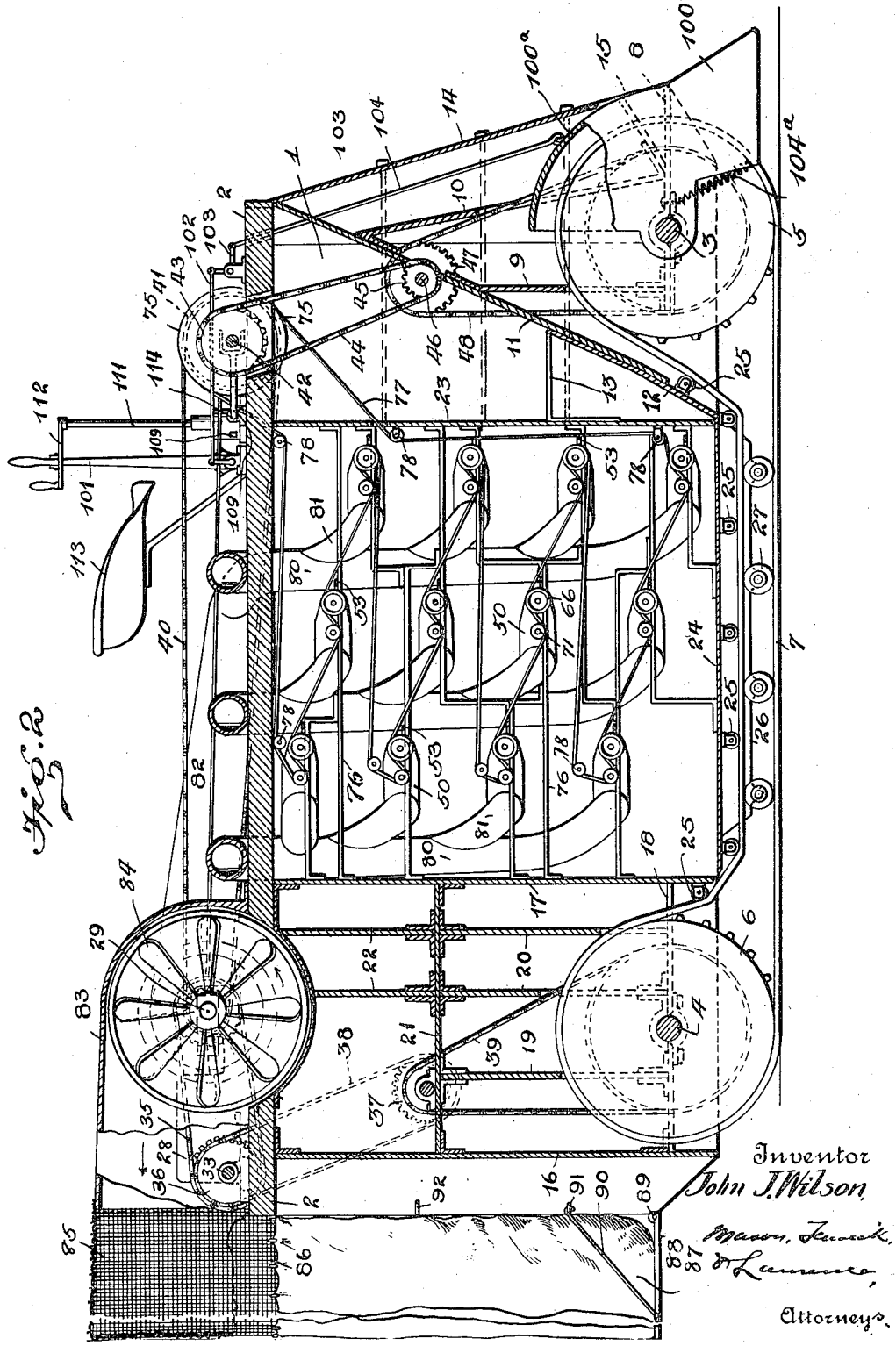

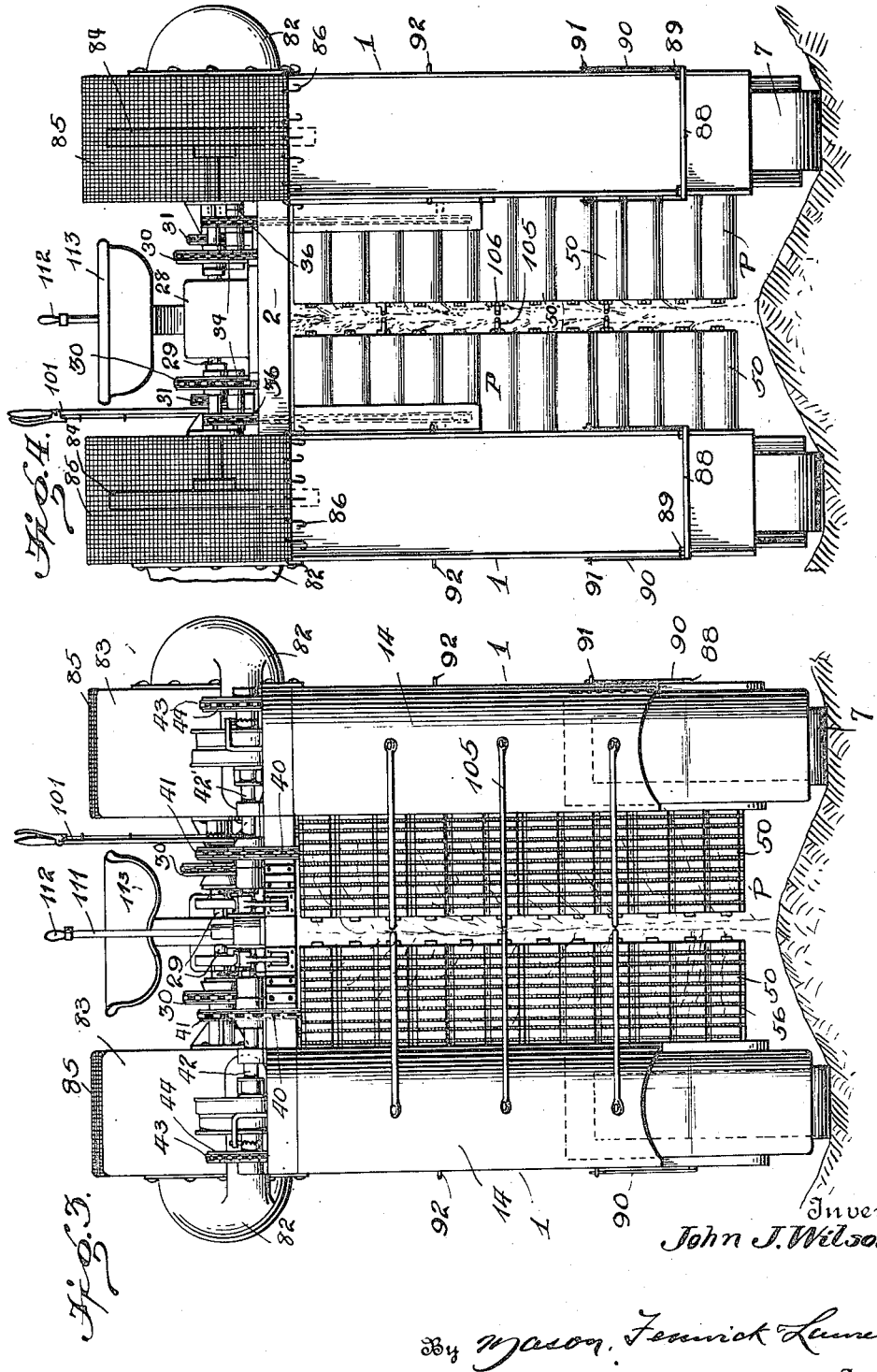

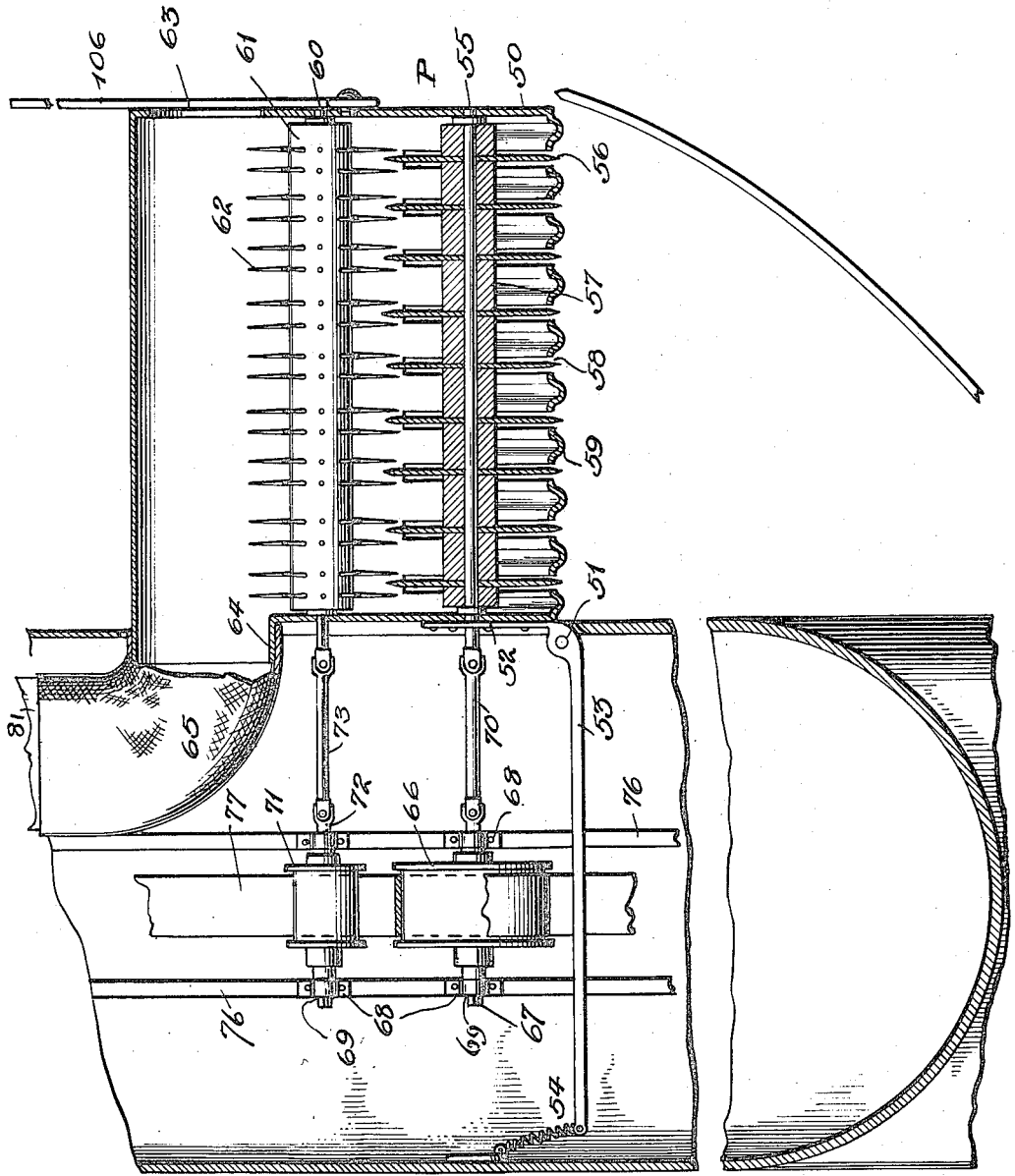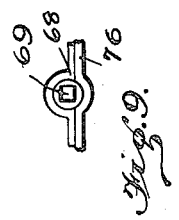

1,451,090

UNITED STATES PATENT OFFICE.

JOHN J. WILSON, OF COLUMBIA, TENNESSEE.

COTTON HARVESTER.

Application filed April 2, 1920. Serial No. 370,789.

*To all whom it may concern:*

Be it known that I, JOHN J. WILSON, citizen of the United States, residing at Columbia, in the county of Maury and State of Tennessee, have invented certain new and useful Improvements in Cotton Harvesters; and I do hereby declare the following to be a full, clear, and exact description of the invention, such as will enable others skilled in the art to which it appertains to make and use the same.

This invention relates to cotton harvesters, designed to be propelled over a field of growing cotton and pick the cotton that is ripe without injuring the plant and without gathering twigs, leaves, or particles of dried bolls with the fibre, or disturbing the unripe cotton.

It comprises in general a vehicle constructed to straddle a row of cotton plants and having mechanical picking elements, projecting from opposite sides toward each other in position to thoroughly search the cotton plants over which the vehicle passes. The vehicle is preferred to be motor driven. To this end I propose to mount on the frame, a motor that is geared to the running gear, and also to the mechanical picker, doffing and conveying means for separating the fibre from the plants and depositing it in receptacles carried on the rear of the vehicle.

One of the principal objects of the invention is to so organize the picking elements that the plants will be thoroughly denuded of the ripe cotton; other objects are to so construct the individual pickers that they may not be broken by obstructions encountered or break down the plants; to erect inclined or fallen plants and branches in position to be subjected in all parts to the action of the pickers; to pick the cotton clean and avoid mutilating unripe bolls; to efficiently doff the fibre from the picking points and convey it to suitable receptacles; to stabilize the vehicle in soft and uneven ground; to protect the plants of the rows next to the row being picked; and to achieve other specified objects as will more fully appear in the detailed description and in the accompanying drawings.

In the drawings:

Figure 1 is a plan view of the harvester.

Figure 2 is a vertical section through one side of the machine.

Figure 3 is a front elevation.

Figure 4 is a rear elevation.

Figure 5 is a fragmental horizontal section, through a picker and one of the lateral housings or side members.

Figure 6 is a view of the casing of a picker, looking at its inner end.

Figure 7 is a cross section through a picker taken fore and aft of the harvester.

Figure 8 is a detail of the fan clutch.

Figure 9 is a detail of a bearing for a picker driving shaft.

Figure 10 is a top plan view of the end of the picker casing.

Similar reference characters designate corresponding parts through the several views.

The frame of the harvester comprises two similar elongated upright side members 1, spaced apart except at their tops where they are united by a horizontal bridging or connecting structure 2, which may be in the nature of a floor or platform, at such an elevation as to clear the tops of the average cotton plants. The side member 1 should be spaced apart a distance to permit passage of the harvester over a plant with freedom, and the total width from outside to outside should be such that the two rows of plants adjacent to the one being picked and over which the harvester is passing will not be mutilated. This would require that the distance between centers of the side members should be approximately the distance between two rows of cotton plants. In cross section the frame bears a resemblance to the letter U inverted, the side members 1, corresponding to the parallel arms of the U. The said side members comprise adequate bracing members and a housing or casing having smooth upright side walls preferably of sheet or plate metal.

The frame of the vehicle may be supported on wheels or other suitable ground-supports or running gear. It is preferred to support it on a gear of the track laying tractor type illustrated more or less conventionally in Figure 2. The harvester frame is necessarily somewhat narrow in proportion to its height, and ordinary wheels travelling over soft earth are likely to sink in soft places and endanger the stability of the vehicle; a similar danger is encountered when wheels meet with hummocks in their travel. A track laying tractor type of running gear produces more stable and even operation over soft or uneven ground. Short axles 3 and 4, are therefore provided extending from side wall to side wall near the front and rear ends respectively of each side member 1. On the front axles 3 are mounted wheels 5 and on the rear axles 4 are mounted wheels 6. Belted around the wheels 5 and 6 on each side is an endless track 7 which may be any of the approved forms adapted for use on track laying tractors.

In the construction shown, the axles 3 are mounted in fore and aft frame members 8, which are stayed by the upright plates or webs 9 and 10, extending upward from the members 8 to an inclined plate or web 11, extending from the forward end of the bridging or flooring part, downward and rearward to member 12, connected to the lower portion of the sides, 1, and braced from the walls 23, by the brace bars 13. The front end of the casing of each side member 1 is rounded and extends downward and forward as shown at 14. Extending diagonally from each axle-carrying member 8 to the curved front plate 14, is a brace 15. Each web 9 and 10 is cut away to admit the passage of a wheel 5, its driving chain and the lifter 100 as shown. Thus the front wheels 5 turn in a housing between the side walls of the member 1, the curved front plate 14, and the inclined web 11, and are so incased that plants will not become entangled with them. The rear wheels 6 are similarly incased between the upright webs or partitions 16 and 17. The axles 4, by which the rear end of the vehicle frame is supported in the hubs of wheels 6 are mounted in fore and aft beams 18, which are stayed by vertical web-like struts 19 and 20, cut away like the bracing webs 9 and 10 to permit the wheels 6 to rotate within the openings and to allow the passage of the driving chains. The upper ends of the struts 19 and 20 bear against a fore and aft member 21, in which a drive shaft is journaled, and two other struts 22 extend from the member 21 in line with the struts 20, up to the floor 2.

Parallel with the plate 17 is a plate 23, and connecting the lower ends of the plates 17 and 23 is a bottom plate 24. Between the side walls of the member 1, the bottom plate 24, floor 2 and upright plates, 17 and 23, which constitute a housing, certain driving mechanism for the picker elements and doffers, and means for conveying the picked cotton are encased.

The structure of the side members thus far described constitutes a sufficiently sturdy framing and mechanism housing to withstand the strains of actual operation in the cotton field, and serves to protect the plants from injurious contact with the mechanism. But it is to be understood that it is only exemplary and that the particular details of bracings and wheel supports are not of the essence of the invention.

On the under side of the plate 24 is a plurality of idle rollers 25 while other similar rollers 25 are placed on the rear side of the lower end of the plate 17 and on the front side of the plate 12. Journaled in flanges 26, projecting downward from the side walls of the members 1, are other larger idle rollers 27. The endless track 7 before described as passing around the wheels 5 and 6 engages said rollers 25 and 27, the upper ply of each track passing beneath the rollers 25 and above the rollers 27, while upon the lower ply of said track said rollers 27 travel. The weight of the mid-portion of the side members is therefore sustained on said endless track 7 thru the rollers 25 and 27, while the front and rear portions are sustained thereon by wheels 5 and 6.

Propulsion is intended to be effected by means of a prime mover mounted on the harvester. This prime mover may be a motor of any approved type, preferably one that may be reversed or that is provided with a reversible transmission. A prime mover is conventionally represented at 28, mounted on the rear end portion of the floor or bridging frame 2. As a suitable propulsion gearing there is shown a shaft 29, adapted to be rotated by the prime mover, said shaft 29, extending transversely of the harvester, and, in the construction shown, adapted to be clutched to two pairs of sprocket wheels, the sprocket wheels of each pair secured together and loose on said shaft 29, but adapted to be clutched thereto by the friction clutch 32. A pair of sprocket wheels, 30 and 31, occurs on each side of the machine as shown. Each sprocket wheel 30, is adapted to drive a short counter shaft 33, carrying a sprocket wheel 34, geared to sprocket wheel 30 by a driving chain 35. Each counter shaft 33, also has secured to it a sprocket wheel 36, which drives a sprocket wheel 37, by means of a drive chain 38. Each sprocket wheel 37 is geared to a main wheel 6 by the chain 39. The front wheels 5 are also driven from the prime mover at the same rate of peripheral speed as are the rear wheels 6. For this purpose the sprocket wheels 31 are geared by drive chains 40 to sprocket wheels 41 secured to counter shafts 42 and 42′ extending in line with each other across the front of the machine. The chains 40, in the embodiment shown, have their upper plies wholly above the bridging platform 2, while the lower plies travel thru guide openings from the lower to the upper side thereof as indicated in broken lines in Figure 2. Secured to the outer ends of the counter shaft 42, and 42′ are sprocket wheels 43, which are geared by driving chains 44 to sprocket wheels 45, secured to counter shafts 46 journaled in the inclined stay plate 11. Also secured to each counter shaft 46 is a sprocket wheel 47 which is geared to a wheel 5 by a chain 48, provision being made for said chain to pass clear of the stays or braces as shown. By gearing to both front and rear wheels 5 and 6, the driving strain tends to tighten the lower ply or track portion of the endless track 7, whether the machine is proceeding forward or backward, a characteristic that is useful in the event of wear or slippage of the track.

One of the more important features of this invention is the construction of the picking devices which project toward each other from the inner side of each side member 1, the vertical planes which include the extremities of the pickers being separated so as to leave between them a space little more than sufficient to permit the passage of the largest stalks of cotton plants as illustrated in the end views shown in Figures 3 and 4. A plurality of picking devices project from each side member. In the embodiment illustrated twelve picking devices are mounted in each side member, in three vertical tiers, each tier comprising four picking devices. As shown in Figure 2, the individuals of each tier are staggered with respect to the individuals of the other tiers and are of such vertical dimension that any branches of a cotton plant that may pass between two pickers of the front tier will encounter a picker of a tier rearward thereof. By this arrangement every cotton plant will be searched from butt to top by the pickers as the machine advances and all ripe fibers be engaged by the pickers.

The picker devices are represented in general by the reference letter P and the construction of these devices is best shown in Figures 5, 6 and 7. Each picker stem or device comprises a casing 50, which is preferably of oval cross section or of a cross section having rounded ends and substantially parallel sides as indicated clearly in Figures 6 and 7. Each casing 50, is hinged at its forward inner corner as at 51 to the inner wall of a side member. As shown in Figure 5, the said casing is bolted to an angular or L-shaped arm, one portion of the arm being bolted as at 52 to the inner end of the picker casing 50. The other arm 53 extends nearly across the side member or housing and at its free end is connected by a spring 54, to the outer wall. The spring 54, is designed to keep the picker stem projected at right angles to the inner wall of the side member, but is intended to yield in case the picker device meets with any excessive resistance and permits the picker to give way rearward and allow the obstruction to pass without danger of breaking the picker or interfering with the advance of the harvester. Journalled longitudinally of and within the casing 50 and adjacent its forward portion is a shaft 55. Spaced apart at equal intervals on the shaft are rotary, toothed picking elements 56. These elements may be any toothed discs or other bodies carrying a series of suitable teeth for picking the fiber from the bolls. The form preferred by me is that shown in Figure 7, and is in the nature of the well-known gin saw, the teeth of which are well adapted to seize upon the cotton fiber. Spacing blocks 57 are provided upon the shaft 55 whereby to equally space the picking elements 56.

An important feature of the picking stems is the mounting of the picking elements 56 within the casing, as illustrated in Figure 5, the feature referred to comprising the slots 58 in the casing, merging into the enlarged openings 58$^a$ in the upper side of the casing, (which are sufficiently large to permit cotton seeds to enter) and the relation of the saws or picking elements 56 to said slots. It will be seen that the peripheries of the picking element 56 or the ends of the teeth of said picking elements project through the slots, but are guarded by curved guards on the casing adjacent the area of the picker that comes first in contact with the cotton plants. The curved front face of the casing 50 in which the slots 58 are formed is provided with curved ribs or projections 59, which are struck on a radius about the axis of the shaft 55 not less than the radius of the picker saw 56. These ribs may be formed in any way, as by pressing or spinning, and are preferably midway between the slots. Their purpose is to prevent twigs and branches or hard matter from becoming entangled with the teeth of the picking elements 56, since said branches will engage the picker crosswise of the ribs, while at the same time the fluffy cotton may be pressed into the space between the ribs and allow the teeth to engage it and draw it from the bolls thru enlarged openings 58$^a$ at the ends of the slots in the upper surface of the casing.

Parallel with the shaft 55 is a shaft 60. This shaft carries the doffing devices 61 and 62 which remove the picked cotton from the picking elements 56. It is intended that the doffer shall rotate at a speed about twice that of the picking devices and in the opposite direction so that the adjacent ends of the doffing teeth and the teeth of the picking elements shall travel in the same direction but at different rates of speed. The doffing device shown in the drawing consists of a cylinder 61, secured to the shaft 60, said cylinder being provided with a large number of radial teeth 62, the teeth being provided in series so that during their rotation their ends pass at each side of the teeth of the picking element 56, in order to remove the cotton adhering to the teeth of the picking elements. As shown clearly in Figure 7, the cotton will be carried rearward by and beneath the doffer into the rear portion of the casing 50, which is free of obstruction.

At the outer end of the rear portion of the casing 50 is an opening 63 to the outer air, and at its inner end is an opening leading to the interior of the side member 1, on which the picker is mounted. The inner end of the casing 50 at this point is provided with a tubular projection 64, over which a flexible pipe 65 is intended to be fitted, said pipe connecting with a trunk leading to a fan or blower. It will be obvious that the cotton removed from the picking elements 56 by the doffer and thrown back into the rear portion of the casing 50, will be sucked by the fan into the flexible pipe 65, and there disposed of as will be presently described.

Each individual picker shaft 55 is driven by a pulley 66, which is splined on a shaft section 67. This shaft section 67 may be squared and the central orifice of the pulley 66 may be correspondingly squared so that the shaft may slide thru said pulley and at the same time may be rotated. In order that the squared shaft section 67 may turn in the bearings 68, a bushing 69 having a squared orifice therein may be seated in each bearing 68. Thru the squared orifice in the bushing the shaft 67 may freely slide while the pulley is prevented from axial movement by engagement of the hubs with the bearings. In order that the pulley 66 may communicate motion to the shaft 55 when the picker yields to an obstruction, a double tumbling joint is provided by means of a section 70 interposed between the shaft section 67 and the inner end of the shaft 55. Precisely similar provisions are made for driving the shaft 60, which is the doffer shaft, from the small pulley 71. In this case the shaft section 72 is squared like shaft section 67 and a tumbling section 73 is interposed between the end of the section 72 and the inner end of the shaft 60. Thus the picking devices and the doffer will be driven by the pulleys 66 and 71 whatever their position may be.

It will be understood that in mounting the casing 50, the inner side wall of the side member 1 to which it is pivoted will be provided with an opening corresponding substantially with the cross section of the picker casing and that room will be provided at the rear in order that the rearward movement of the picker casing 50 may take place.

The driving means for the picking elements and doffers is best shown in Figure 2. Upon each side of the machine, mounted upon the shafts 42 and 42' is a pulley 75. Running fore and aft within the side walls of the casing 1 is a series of bars, or other shaft supports 76, upon which the bearings 68 for the squared driving shafts of the picking elements and doffing devices are mounted. As shown in Figure 2, a belt 77 passes around the pulley 75 and around the several pulleys 66, 71, and the idle pulleys 78, whereby all of the picking elements on one side are driven at the same surface speed, and whereby all the doffing elements are driven at the same speed, which is twice the speed of the picking elements, and whereby the doffing devices and picking elements are driven in opposite directions as described.

Upon reference to Figure 2, it will be seen that in each side member there are three upright conduits, 80, preferably of metal, and that each of these conduits has four branches 81, preferably of metal, to the ends of which branches 81, flexible connections 65, before referred to, are attached. Each branch 80, at its upper end communicates with a trunk 82, and the trunk 82, opens at its rearward and larger end into the pump or fan casing 83. Within the pump casing is a rotary fan 84, with the vanes arranged at such an inclination that when it moves clockwise during the forward motion of the harvester the air will be drawn from the picking devices into the casing and will be discharged thence into a reticulated separating chamber 85.

The lower portion of the reticulated chamber 85 is open and a series of hooks or other devices 86, are applied to its lower edge, to which a bag 87, for receiving the cotton may be attached. The lower portion of the bag rests upon a shelf 88 hinged at 89 and adapted to be turned down into a horizontal position and there braced by the bracing hook 90, which is adapted to be hooked into a staple or eye 91, on the rear part of the frame. The shelf 88, may be folded upward against the rear end of the frame and the hook 90 hooked into the staple or eye, 92, if desired. In order that the fans may not rotate in reverse directions so as to blow air out thru the pickers in case the machine is being backed it is preferred to attach said fans to the shaft 29, by a means of ratchet devices or one way clutches, as indicated at 93.

As shown in Figures 1 and 2, a stalk or branch-lifter is pivoted on the front axle of the machine and is adapted to be manipulated by the operator thru the lever and link connections 101, 102, 103 and 104, illustrated in Figure 2. Pulling rearward on the lever 101, elevates the end of the stalk lifter 100 so that in proceeding forward as in hummocky ground the end of the lifter 100 may be elevated above the ground so that it will not plow into it. A spring 104ª may be used to counterbalance in part the weight of the stalk lifter 100. The relation of the stalk lifter 100, to the front inclined surface 14 of the side member 1, is such that in its various positions a close connection will be made between the surface 14 and the surface of the lifter. To this end the lifting end of the lifting member 100, merges into a hollow member 100ª which is curved and embraces the ground wheel 5, and turns about the axis thereof so that during no change of position will its surface be farther away from the lower edge of the wall 14, than at any other position.

Not only is the stalk lifter 100 provided to lift up broken down and fallen stalks so that they may be presented properly to the passage between the side member 1 of the harvester but also stalk straightening devices 105 are provided which are attached to the front of the inclined member 14, of the side members 1. These comprise two series of bars, one series on each side member which converge or incline rearward so as to direct all stalks held by them towards a space central of the pickers and prevent, in so far as possible, the thick central stems of the plants from coming in contact with the front face or edge of the pickers. In order to hold the stalks and limbs from inclining too far out of the vertical position after they have passed the pickers, other stalk guides 106 are provided. A stalk guide 106, is bolted to the front end of each casing 50, and the free ends of those bolted to the forward picker casings extend rearward to the next row of pickers in the rear. Thus the stalk lifters 100 and the stalk guides 105 and 106 tend to bring the cotton plants which are being picked into an erect position best adapted for the action of the picker on the plant.

In order that the picking devices may not be driven while the machine is being transported from place to place, the pulleys 75 are sleeved loosely on the shafts 42 and 42' and are adapted to engage with clutch members secured to said shaft when desired. Two similar mating clutch members are shown at 107, one being secured to the shaft, (the outer one) and the other secured to the hub of the pulley 75. The inner end of the hub of the pulley is provided with a flanged or collar member, is controlled by a clutch shipper 109. The inner ends of these clutch shippers overlap each other and are provided with rack teeth as shown at 110. Between the rack teeth 110 is a vertical bar 111, which carries at its lower end a pinion meshing with said rack teeth, the upper end of the bar having a crank handle 112, within reach of the operator sitting in the seat 113. The shippers 109 are guided in slide bearings 114.

Thus by manipulating the handle, the operator may move the pulleys 75 out of driving engagement with the shafts 42 and 42' or into driving engagement with them as desired.

In order that the machine may be steered, cone clutches 115 of a well known construction are provided. Being of frictional type, the speed of the different sides of the machine may be regulated by said clutches. Each is controlled by a clutch shipper 116 which is connected by a rod 117, to a foot lever 118, one on each side of the operator's seat, whereby, at will, he can engage both clutches or one of them or allow one to slip and the other to grip in order to drive different sides of the machine at different speeds, if desired. This, however, is no part of my invention, and any of the several known means of steering motor tractors may be adopted.

In operation the harvester will be guided astride a row of cotton plants. Those that droop or have been inclined or beaten down will be lifted by the lifter 100, straightened up by the guides 105, and presented with their stalks upright between the ends of the pickers P. The branches extending laterally will engage the pickers and the teeth of the picking elements will entangle themselves with the fluffy fibre and draw it into the casing 50 through the slots. The picking teeth should be strong, hooked and pointed like the teeth of a gin saw to act positively upon the fibre and pull it vigorously from its attachment within the boll. The doffers, rotating at high speed, mechanically sweep the cotton from the teeth, and as they create considerable current of air owing to their speed, not only sweep but fan it rearward until it is well within the strong air currents produced by the fan. The cotton having entered the air current produced by the fan passes through the air pipes into the fan casing and into the reticulated separator whence the air passes out through the meshes of the separator and the fibre drops into the bag or sack suspended beneath it. When a bag is filled it may be quickly removed and another hooked in position. Owing to the smooth side walls and the housing of all moving parts within them, the plants cannot be injured and no part of them can be removed except the cotton that is in condition to be picked.

Having described my invention in the best embodiment now known to me, what I claim and desire to secure by Letters Patent is:

1. In a cotton harvester, a frame, a plurality of pickers arranged at different levels, each picker being independently pivoted to said frame on a fixed pivot so as to project transversely of the direction of travel, and means for yieldingly holding each independent picker in its normal projected position.

2. In a cotton harvester, a frame, a picker pivoted thereto so as to project transversely of the direction of travel, an arm extending from the picker to that side of the pivot opposite to that from which the picker projects, and means attached to the arm for holding the picker yieldingly projected.

3. In a cotton harvester, a frame, a picker thereon projecting transversely of the direction of travel, said picker comprising a casing having openings and picking elements within the casing adapted to draw the cotton fibre through the openings, a pivotal connection between the frame and the inner end of the casing, at the junction of the front side of the casing and frame, and a spring holding the casing in projected position.

4. In a cotton harvester, a frame having a smooth wall provided with an orifice, a picker comprising a casing having openings, and picking elements within the casing to draw the cotton fibre through the openings, the orifice in the wall being of a size and shape to correspond with the size and shape of the inner end of the picker casing, a pivotal connection between the wall and the picker casing, and a yielding means for holding the picker casing extended.

5. In a cotton harvester, a frame comprising a housing with smooth walls, an orifice in one wall, a picker comprising a casing having the forward portion of its inner end pivoted at the forward edge of the orifice, the orifice being of a size and shape corresponding to the size and shape of the inner end of the picker casing, an arm extending from the picker casing within the housing and a yielding member attached to the arm tending to hold the picker extended.

6. In a cotton harvester, a frame, a picker comprising a casing extending transversely of the direction of travel of the harvester, said casing having a plurality of narrow openings in its front face for the admission of cotton fiber and an air conduit extending through said casing, rotary toothed disks journalled within the casing in planes intersecting said openings lengthwise, the teeth of said disks being disposed within said openings and adapted to draw cotton fiber through said openings, a doffer adapted to strip the fiber from the disks and to discharge it into the air conduit, and means for creating an air current in said air conduit for removing the fiber.

7. In a cotton harvester, a frame, a plurality of independently mounted pickers arranged at different levels, each picker comprising an orificed casing hinged to the frame and projecting normally transversely of the direction of travel of the harvester, a yieldable device for each picker, said yieldable devices tending to hold each picker in normal position independently of the position of the other pickers, means for creating an air current through said casing, a conduit on the frame and a flexible pipe section connecting the casing with the conduit on the frame.

8. In a cotton harvester, a frame, a plurality of independently mounted pickers arranged at different levels, each picker comprising a projecting orificed casing hinged to said frame, an independent yieldable device for each picker, said devices tending to hold each picker projected transversely of the direction of travel of the harvester so that it may yield independently of all of the other pickers, movable picking elements within the casing, shafting within the casing for operating the picking elements, shafting on the frame, and flexible driving connections between the shafting in the casing of the picker and the shafting on the frame.

9. In a cotton harvester, a frame, a cotton picking device comprising a casing hinged to said frame and projecting therefrom, movable elements within the casing, shafting within the casing for operating said movable elements, endwise movable shafting on the frame, rotary driving means splined on said shafting on the frame, means to prevent the rotary driving means from moving axially with the shafting, and flexible driving connections between said endwise movable shafting and the shafting in the picker casing.

10. In a cotton harvester, a picking device comprising a casing having a slotted wall, movable picking elements disposed within the casing, said picking elements having cotton fiber engaging teeth projecting through the slots during a portion of their movement, and so formed as to draw the fiber through said slots into the casing, and guards disposed between the slots, said guards projecting substantially as far as the teeth and extending substantially parallel with the path of movement thereof in order to prevent the points of the teeth from engaging the branches of the cotton plant.

11. In a cotton harvester, a picking device comprising a casing having a slotted wall, movable picking elements disposed within said casing, said picking elements having cotton fiber engaging teeth projecting slightly through the slots during a portion of their movement and so formed as to draw the fiber through the slots into the casing, and ridges on the wall so disposed that their forward surfaces guard the teeth in order to prevent hard substances from contacting with them.

12. In a cotton harvester, a picking device comprising a casing having a curved front wall provided with slots extending in the direction of curvature, disks having pointed hooked teeth mounted to rotate within the casing in planes intersecting the slots lengthwise, the front wall of said casing having guarding projections formed thereon between the slots and raised from the surface substantially as far as the teeth project beyond it so as to prevent engagement therewith of the branches of the cotton plant.

13. In a cotton harvester, a picking device comprising a casing, having a curved front wall provided with slots extending in the direction of curvature, a shaft within the casing carrying disks provided with pointed, hooked teeth moving in a plane intersecting the slots lengthwise, a rotary doffing device rearward of the disks and provided with radial members adapted to pass on opposite sides of the teeth, means for rotating the toothed disks, means for rotating the doffing devices at a greater speed than the toothed disks in the opposite direction, and means for removing the fiber stripped from the toothed disks by the doffer.

14. A cotton harvester comprising a vehicle having a frame of inverted U-shape in cross section, providing two side members, picking devices extending from the inner side of each side member, a stalk lifter at the front of each side member, and guide bars each having one end secured to the front of a frame member for directing stalks to a central position between the side members, said guide bars terminating adjacent the ends of the forward picking devices.

15. In a cotton harvester, a frame of inverted U-shape in cross section providing two side members, a plurality of tiers of picking devices extending from the inner side of each side member and providing a narrow passage between them, a stalk guiding bar secured by its front end to the outer end of each of a plurality of pickers, and disposed so as to extend rearward a distance equal to the space between the tiers.

16. In a cotton harvester, a frame of inverted U-shape in cross section, providing side members adapted to straddle a row of plants, supporting wheels housed within the side members, endless tracks surrounding the wheels, a motor on top of the frame and gearing for driving the wheels from the motor.

17. In a cotton harvester, a frame of inverted U-shape in cross section providing side members adapted to straddle a row of plants, front and rear supporting wheels housed in the side members, endless tracks surrounding the wheels, the mid portion of said side members resting on the upper plies of the track, a motor on top of the frame, and driving connections from the motor to the front and rear wheels.

In testimony whereof I affix my signature.

JOHN J. WILSON.